United States Patent

Hunt et al.

(10) Patent No.: US 6,647,649 B2
(45) Date of Patent: Nov. 18, 2003

(54) MICROPARTICLE TAGGANT SYSTEMS

(75) Inventors: Daniel R. Hunt, Mounds View, MN (US); Charles S. Hanson, Lakeville, MN (US)

(73) Assignee: Tracking Technologies, Inc., Minneapolis, MN (US)

( * ) Notice: Subject to any disclaimer, the term of this patent is extended or adjusted under 35 U.S.C. 154(b) by 11 days.

(21) Appl. No.: 09/997,485

(22) Filed: Nov. 30, 2001

(65) Prior Publication Data

US 2002/0129523 A1 Sep. 19, 2002

Related U.S. Application Data

(63) Continuation-in-part of application No. 09/454,441, filed on Dec. 3, 1999
(60) Provisional application No. 60/110,889, filed on Dec. 4, 1998.

(51) Int. Cl.$^7$ .................................................. G06K 7/00
(52) U.S. Cl. ............................ 40/326; 235/494; 283/93; 283/114
(58) Field of Search .............................. 40/299.01, 306, 40/312, 326, 828, 630, 638, 594; 283/93, 114, 82, 83, 91; 235/487, 488, 493, 494

(56) References Cited

U.S. PATENT DOCUMENTS

| | | | |
|---|---|---|---|
| 1,787,995 A | 1/1931 | Reilly | |
| 3,567,909 A | 3/1971 | Allen | 235/61.11 |
| 3,632,993 A | 1/1972 | Acker | 235/61.11 |
| 3,663,801 A | 5/1972 | Wahli et al. | 235/61.11 E |
| 3,835,297 A | 9/1974 | Inoue et al. | 235/61.11 |
| 4,023,040 A | 5/1977 | Weber | 250/566 |
| 4,053,433 A | 10/1977 | Lee | 252/408 |
| 4,097,279 A | 6/1978 | Whitehead | 430/39 |
| 4,606,927 A | 8/1986 | Jones | 427/7 |
| 4,824,144 A | 4/1989 | Tasma | 283/87 |
| 5,129,974 A | 7/1992 | Aurenius | 156/64 |
| 5,426,289 A | 6/1995 | Kinoshita et al. | 235/469 |
| 5,568,555 A | 10/1996 | Shamir | 380/51 |
| 5,659,631 A | 8/1997 | Gormish et al. | 382/166 |
| 5,818,032 A | 10/1998 | Sun et al. | 235/494 |
| 5,869,828 A | 2/1999 | Braginsky | 235/467 |
| 6,108,612 A | 8/2000 | Vescovi et al. | 702/150 |
| 6,147,149 A | 11/2000 | Anderson et al. | 524/407 |
| 6,455,157 B1 * | 9/2002 | Simons | 428/402 |

FOREIGN PATENT DOCUMENTS

| | | |
|---|---|---|
| CA | 2223163 | 10/1997 |
| DE | 19614174 | 11/1997 |
| GB | 1568699 | 6/1980 |
| WO | 99/45514 | 9/1999 |

OTHER PUBLICATIONS

U.S. patent application Ser. No. 09/454,441, Hunt et al., filed Dec. 3, 1999.

* cited by examiner

*Primary Examiner*—Lynne H. Browne
*Assistant Examiner*—Kenn Thompson
(74) *Attorney, Agent, or Firm*—Vidas, Arrett & Steinkraus

(57) ABSTRACT

A microparticle taggant having two or more distinguishable marker layers corresponding to a predetermined numeric code. The plurality of particles comprises a plurality of microparticle sets of at least one microparticle, each microparticle set is characterized by a specific marker layer combination different from each other microparticle set, and the combination of microparticle sets employed in said taggant collectively forms the numeric code. Each specific marker layer combination may employ two or more layers. The microparticle sets employed in the taggant may include at least one datum marker layer coded to include place information and at least two value marker layers coded to specify a value within the place, the datum marker layer(s) being readily distinguishable from the value marker layers and functioning to identify an orientation of the value marker layers.

22 Claims, No Drawings

MICROPARTICLE TAGGANT SYSTEMS

CROSS REFERENCE TO RELATED APPLICATIONS

This application is a continuation-in-part of copending application Ser. No. 09/454,441, filed Dec. 3, 1999, which claims priority to U.S. Provisional Application Serial No. 60/110,889, filed Dec. 4, 1998, entitled MULTI-COLORED TAGGANT ELEMENTS. The disclosure of each prior application is incorporated herein by reference in its entirety.

FIELD OF THE INVENTION

This invention relates to a system for coding an article using a microparticle taggant system and to products marked therewith.

BACKGROUND OF THE INVENTION

Manufacturers of materials which are shipped in bulk and can be easily confused, such as chemicals, paints, oils, plastics, pigments, clays, fertilizers and explosives, have desired methods for identifying samples of their product, for example, to determine its corresponding shipment or manufacturing lot number, or to determine its particular date and method of manufacture, packing, shipment, etc.

A variety of methods are available for marking bulk materials. For example, U.S. Pat. No. 1,787,995 describes a method for identifying lubricating oil by adding small markers such as letters, initials or arbitrary symbols of about the same specific gravity as the lubricating oil to the oil.

U.S. Pat. No. 4,053,433 describes a method of marking a substance with microparticles which are encoded with an orderly sequence of visually distinguishable colored segments that can be detected with a microscope or other magnifying device.

GB 1568699 describes systems for making microparticles of layered colored material, which have generally parallel flat surfaces at the extremities of the code with irregular broken edges therebetween, allowing for visualization of the code. Incorporation of the microparticles in a clear lacquer is disclosed as a method for applying the microparticles to objects.

DE 19614174 describes a process for producing multi-layered microparticles by forming a laminate sheet of colored layers and crushing the sheet. The individual marking layers are applied by a printing process, by bronzing, by spray painting or by roll coating.

U.S. Pat. No. 4,606,927 describes microparticle taggants encased in a transparent solid matrix obtained by hardening a liquid adhesive.

Since the late 1970's, color-coded micro-particles have been on the market for the purpose of covertly tagging materials and finished goods. These particle systems are still in use today and have been modeled after the color-coding scheme used for many years on electrical resistors. By assigning numeric values to colors, and placing the colors in layers next to each other, numeric information can be encoded into particles of various sizes. The common color scheme used has been the decimal values 0 through 9 represented by black, brown, red, orange, yellow, green, blue, violet, gray, and white respectively.

Microtrace, a Minnesota company, uses colored plastic particles to mark materials such as explosives and consumer objects. The basis of their coding system is the layering of colors in those particles, where the order of the different colors creates a number using the color code scheme found on common electrical resistors, with some adjustments as discussed below.

To use such a system where the colored layers must be read in a specific order, there must be some means of indicating the particle orientation, i.e. which observed layer has the least value and which numeric places the other layers represent. This has been achieved through the use of a black "datum" layer. The datum layer indicates that the layer adjacent to it is the lowest value numeric place, with subsequent layers representing increasingly higher numeric places. For example, if a coded particle has black, red, green, yellow, and orange layers respectively, the black layer indicates that the red layer is in the lowest numeric place. Thus, given the common scheme described above, the numeric code is 2 plus 50 plus 400 plus 3000, representing a decimal value of 3452.

One of the drawbacks of this approach is that using one of the numeric value indicators for the datum means that the adjacent layer can never have that value. In this case, the lowest numeric place, represented by the second layer, can never have the value of zero. This eliminates 10 percent of the available numeric codes, dropping the first numeric place from base 10 to base 9. Likewise, each of the other layers cannot use colors when they are used in adjacent layers dropping them, as well, from base 10 to base 9. Thus, a five-layer particle, using 10 colors as value indicators, will yield $9^4=6561$ numeric codes, and a 7-layered particle will yield $9^6=531,441$ numeric codes.

To partially remedy the problems associated with having a limited number of codes and the limitations of slow code formulation, providers of the scheme described will sell the same codes to multiple buyers, differentiating them by a "corporate code." The corporate code is represented by 3 layers, such as red/black/red for a first customer, and is unique to each customer. However, numeric "sub-codes" of a higher number of layers are commonly provided to many customers. Consequently, when a sub-code is supplied to another customer containing a corporate code sequence anywhere in the number, e.g., in the sequence red/black/red/yellow/red, particle fragments can be can be produced which may be misread as the first customer's corporate code.

Microparticle taggants potentially can be used for identifying many types of materials or objects, including bulk materials (e.g., fertilizer, chemicals, paints, oils, plastics, pigments, clays, fertilizers, explosives, etc.), prepackaged materials (e.g., shampoo, conditioner, lotion, motor oils, pharmaceuticals, etc.) and individual product units (e.g. stereos, cameras, computers, VCRs, furniture, motorized vehicles, livestock, etc.). This potential, however, has not been widely realized, at least in part due to the large expense in manufacturing uniquely coded particles.

A need exists therefore for a microparticle taggant system that will allow practical code-formulation, while maximizing numeric information and yet be easily understood and utilized by a customer.

SUMMARY OF THE INVENTION

The invention in various aspects relates to processes for marking an article by applying thereto a taggant, marking formulations comprising a taggant, and articles marked with a taggant. The taggant comprises a plurality of microparticles having two or more distinguishable marker layers corresponding to a predetermined numeric code.

In one aspect the invention is characterized in that the plurality of particles comprises a plurality of microparticle sets of at least one microparticle, each microparticle set is characterized by a specific marker layer combination different from each other microparticle set, and the combination of microparticle sets employed in said taggant collectively forms the numeric code.

Suitably, the marker layers each comprise a distinguishably different color or color enhancer. In some embodiments, each of the specific marker layer combinations employed in the taggant has the same number of layers and/or each specific marker layer combination employs two or three layers. The taggant may be formulated with a binder, such as an adhesive or coating complace, which fixes the taggant to the object or material.

In some embodiments of the invention, each said specific marker layer combination employs two layers, the numeric code is a binary code having a predetermined number of places and having two values at each place, each microparticle set codes for one said value in a specific place in the code and the absence of said microparticle set in the taggant codes for the other said value at said specific place.

In a further aspect of the invention, the microparticle sets employed in the taggant include at least one datum marker layer, which function to identify an orientation of the value marker layers coded and is also coded to include place information, and at least two value marker layers coded to specify a value within the place, the datum marker layer(s) being readily distinguishable from the value marker layers.

In some embodiments, the present invention enables a full series of contiguous numeric values to be presented in a microparticle taggant without suffering any gaps in the numeric sequence available. This is particularly advantageous where the numeric value codes for a sequential series, such as a date, driver's license, etc., which cannot be adequately represented with systems containing sequence gaps.

DETAILED DESCRIPTION OF THE INVENTION

According to this method, an assortment of microparticles is manufactured. A coding system is then used, wherein each microparticle contains both place and value information for a portion of a number such that a series of microparticles can be combined to represent the number. An object can then be marked with the series of microparticles. Generally, to mark flowable material (including liquid and/or particulate material), the series of microparticles are admixed with the flowable material. To mark an individual object, the series of microparticles are typically adhered to the object.

Each microparticle can include a single color, or a plurality of colors. Preferably, each microparticle comprises at least two distinguishable colors. In some embodiments, each microparticle comprises no more than two distinguishable colors.

Methods are known for manufacturing microparticles, for example as disclosed in U.S. Pat. No. 4,053,433. Another method for manufacturing microparticles includes applying a colored resin, such as Resimene® 735, to a hard, smooth substrate, such as glass. The colored resin is typically applied as a liquid, for example, by spraying the liquid resin onto the substrate or by applying the liquid resin to the substrate and spreading it out to a desired thickness using a draw-down bar. After the first coating has dried, a second coating is applied over the first coating using a resin of a second color. After the second coating is dried, the resin is cured. Typically, the coated substrate is heated to approximately 350° F. for about 30 minutes to cure the resin. After the substrate and resin are cooled, the coating can be scraped from the substrate, for example, using a razor blade. The microparticles may then be ground and sieved to collect the desired sized particles.

The size of the microparticles can vary, depending on the object being identified. In some instances it might make sense to identify an object, for example particulate material such as fertilizer or liquid material such as shampoo, with microparticles that are about 10 microns to about 500 microns at their average cross section dimension. In contrast, it might make sense to identify a large object, such as an automobile, using microparticles that are about 0.5 millimeter to about 1 millimeter at their average cross section dimension. For other uses, particles that are greater than 1 millimeter at their average cross section dimension might be suitable, for example, to mark large particulate matter such as mulch. For many applications, microparticles that are small enough to pass through a 50–100 mesh screen are suitable. Typically, the microparticles are about 10 microns to about 500 microns at their average cross section dimension, more typically about 50 microns to about 500 microns, most typically about 50 microns to about 100 micrometers. For some applications even smaller dimensions may be employed, for instance about 0.1 microns to 10 microns.

The concentration of microparticles used to identify an object can also vary. For example, when the microparticles are used to identify a flowable material, the microparticles might be incorporated into the material at a concentration of 0.0001 to 1 part by weight for every 100 parts by weight material. If the microparticles are used to identify an individual object, the microparticles may be combined with an adhesive at a concentration of 0.0001 to 1 part by weight for every 100 parts by weight adhesive and applied to the individual object for identification purposes. Preferably, the adhesive is transparent, such that the microparticles are readily visible. Examples of suitable adhesives include lacquers and enamels, such as acrylic, alkyds, etc.

The disclosure provides a system for marking an object, for example, to indicate ownership, source or origin. The method involves the use of an assortment of microparticles that are used as a part of a coding system wherein each microparticle represents a specific place in a number. A series of microparticles can be combined to represent a number and used to mark an object. The number may be dictated from outside the microparticle system since there are no gaps in the numeric sequence.

To facilitate an understanding of the method, a brief discussion of a numeric system will first be provided.

In the decimal system, numbers are organized into numeric positions or "places." For example, a "hundreds" place, a "tens" place, and a "ones" place such that the number "193" is 1-hundreds plus 9-tens plus 3-ones. According to this system, the "ones" place means $10^0$, the tens place means $10^1$, and the hundreds place means $10^2$. The decimal system uses the digits 0–9 to represent numbers. To represent a larger number, such as the number twelve, multiple places are used.

The binary system works under the same principles as the decimal system, only it operates in base 2 rather than base 10. In other words, instead of the places being $10^2$, $10^1$, and $10^0$, they are $2^2$, $2^1$, and $2^0$. Instead of using the digits 0–9, only the digits 0 and 1 are used. A number larger than 1, for example the number 3, is represented using multiple places. The decimal number 3 is represented by the number "11" in binary $(1 \times 2^1)+(1 \times 2^0)$.

The coding system may involve an assortment of microparticles in which each microparticle represents a specific place in a binary number, such that a series of microparticles can be combined to represent a number. In a binary system, for example, the standard may be established such that when a particle is present in a mixture, the numeric place represented by that particle contains the value "1". If a particle corresponding to a particular numeric place is not present in a mixture, the numeric place represented by the particle contains the value "0". Alternately, in a numeric system established for base 3, a standard may be established where the absence of a particle is represented by the value "0" at that place, the presence of a specific form of the particle (designated, for example, by color, presence or absence of a visual enhancer, shape or number of layers) represents the value "1" at that place, and a different form of the particle represents the value "2" at that place, and so on.

Each microparticle can include a single color, or a plurality of colors. Preferably, each microparticle comprises at least two distinguishable colors. In one embodiment each microparticle comprises just two distinguishable colors.

If single microparticles are made using eight different colors, $2^8$ or 256 binary numbers can be created. If the same eight colors are used to make dual-color microparticles (i.e., particles having two color layers each), 28 unique dual-color microparticles can be created (see Table 1, below). The 28 unique microparticles can be used to formulate $2^{28}$, or 268 million binary numbers.

TABLE 1

|   |         | gold | silver | Magenta | black | green | yellow | blue | Total |
|---|---------|------|--------|---------|-------|-------|--------|------|-------|
| 1 | red     | x    | x      | x       | x     | x     | x      | x    | 7     |
| 2 | blue    | x    | x      | x       | x     | x     | x      |      | 6     |
| 3 | yellow  | x    | x      | x       | x     | x     |        |      | 5     |
| 4 | green   | x    | x      | x       | x     |       |        |      | 4     |
| 5 | black   | x    | x      | x       |       |       |        |      | 3     |
| 6 | magenta | x    | x      |         |       |       |        |      | 2     |
| 7 | silver  | x    |        |         |       |       |        |      | 1     |
| 8 | gold    |      |        |         |       |       |        |      | 0     |
|   |         |      |        |         |       |       |        |      | 28    |

Note that at this juncture, the numbering system makes a distinctive departure from the prior art of microparticle taggants. The eight colors are no longer used to represent numeric values. Instead they are used to create a set of color combinations that is greater in number than the original eight colors and the resulting combinations are then used to represent numeric information. Values are assigned only to those combinations that are permissible in a layered taggant, so that no gaps occur in the numeric sequence. As shown in Table 1, pairing eight colors can create twenty-eight distinctive color combinations representing numeric information.

The number of microparticles possible, X, is characterized by the equation:

$$X=1+2+3 \ldots +N$$

where N=K−1 and K=the number of colors available.

For example, if six colors are used, N=1+2+3+4+5=15, and so 15 paired color microparticles can be made which can formulate $2^{15}$, or 32,768 binary numbers.

If four colors are used, for example, blue, red, yellow and black, permutations of the four colors can create six distinctive microparticles: blue/red, blue/yellow, blue/black, red/yellow, red/black and yellow/black. According to the system of the invention, each of the microparticles (in this example, six dual microparticles) is assigned to represent a specific place in a binary number. A representative system is shown in Table 2 below. For purposes of this example, the standard is established in Table 2 that place #1 represents $2^0$, place #2 represents $2^1$, place #3 represents $2^2$, and so on.

TABLE 2

| Colored Particle | Binary Place |
|---|---|
| blue/red | place #1 |
| blue/yellow | place #2 |
| blue/black | place #3 |
| red/yellow | place #4 |
| red/black | place #5 |
| yellow/black | place #6 |

If, for example, three different codes are needed to mark three objects, the binary numbers 10100, 111100 and 101000 may be the binary numbers assigned to each of the items. Using the representative system shown in Table 2, above, the particle representation of the first binary number, 10100 is formulated using the particles that represent the fifth and third binary places (i.e., red/black and blue/black). An appropriate quantity of each of the red/black particles and the blue/black particles is thus combined. To formulate the particle representation of the binary number 111100, the particles representing the sixth, fifth, fourth, and third binary numeric places are combined. For the binary number 101000, the particles representing the sixth and fourth binary places are combined. Once the object is marked, identification of the object can be made by examining the series of microparticles.

Advantageously, quantitative information about the microparticles is not needed to identify the object. The presence or absence of specific microparticles need only be detected. Thus, the method is less vulnerable to problems caused by dilution and/or contamination of the material.

Additionally, the method allows for the formulation of a large set of unique microparticles, particularly microparticles that are each made up of more than one color (e.g., "multi-colored" particles). Multicolor particles require fewer colors to provide a larger number of distinctive microparticles. Multicolor microparticles are advantageous in that finding, for example, 28 distinctive colors may be difficult because of the limited number of colors to chose from. For example, rather than using permutations of eight colors to form 28 unique tags (as described above), 28 different colors would have to be used. To acquire 28 different colors, one might consider using gold, bronze, and copper. However, these colors may be difficult to differentiate from one another, particularly when admixed with other materials. Because gold, bronze and copper colors are not very distinctive from one another, use of these three colors in a system could result in errors in product identification. Thus, only one color from this group, such as gold, may be a practical choice.

In some embodiments of the invention, particles having two colored layers are preferred. Dual layer microparticles provide a great diversity of combinations while reducing the impact of byproducts. For example, during manufacturing, shipping, handling or other processing, dual layer microparticles may fracture to form single color byproducts. Because the relative size of the single colored byproduct is about 50% of the overall thickness of a dual layer microparticle, the single colored product is easily removed from the microparticles during a screening phase of production.

Additionally, single colored byproduct remaining during product identification is not easily confused with a dual layer microparticle. Thus, if a single color particle, such as a solely green particle, is visible in a marked material, it can be discounted; and only paired colors, such as green/silver and green/yellow are considered as valid.

In contrast, a 5-layered particle can fracture to form 4, 3, 2 and 1-layered byproducts. However, 4 and 3-layered byproducts may be too close in size to the 5 layered particles to be effectively removed by screening during the manufacturing process (for example, a 4 layered byproduct is about 80% of the thickness of a 5 layered microparticle). Identifying 5-layered particles among 4 layered byproduct particles may make product identification more difficult. The likelihood of having a 3-layered byproduct reduces effective use of 3-layered particles in combination with 5-layered particles. Additionally, when particles are used having more than two color layers, an indicator may be necessary to denote which side of the particle represents the highest or lowest value numeric place.

According to the invention, a specific series of microparticles is used to mark an object. As used herein, the term "object" includes both solid and flowable materials. As used herein the term "flowable" refers to any material or substance that changes shape or direction uniformly in response to an external force imposed on it. The term applies to both liquids (such as oils and shampoos) and particulate matter (such as fertilizer, sand and clays). It should be noted that liquids can vary greatly in viscosity and may contain suspended particulate matter. Particulate matter can vary greatly in size and includes within its scope, fine particles with an average diameter of less than about 5 mm, and large particles with an average diameter greater than about 5 mm. Examples of flowable materials include, but are not limited to, petroleum products; personal care products such as shampoo, conditioner, lotion, cologne and perfume; pharmaceuticals, etc. The series of microparticles can be combined with a flowable material, (prepackaged or bulk) or adhered to an individual object for identification.

The microparticles may be incorporated into the material at a concentration of 0.00001 to 1 part by weight for every 100 parts by weight material. Much lower concentrations, for instance one part per ten billion by weight, or even less, can be used when suitable concentration and isolation methods are employed, such as magnetic concentration and isolation of microparticles attractive to magnets.

If the microparticles are used to mark an individual product unit, the microparticles can be combined with a binder, for instance an adhesive or coating formulation, preferably a transparent binder. Suitable binder materials are known and include lacquers and enamels such as acrylics and alkyds, hot melts, etc. The resulting particle/adhesive mixture can then be applied to the surface of an individual object for identification purposes. It should be noted that some flowable products, such as shampoos, conditioners, and lotions are often packaged. In the case of a prepackaged material, the microparticles can be combined with the packaged material, or adhered to the container or bottle, label, lid or any other packaging or shipping container.

The marked object can be subsequently identified to determine the presence or absence of microparticles. If the particles are visible to the naked eye, the examination may be performed without additional equipment. For particles that are not easily visualized by the naked eye, equipment such as a light microscope or a magnifying glass may be used. Typically, the microparticles can be examined using a common 40 and/or 100 power inspection microscope.

The presence or absence of specific microparticles is detected and recorded and a standard, such as that shown in Table 2, is consulted to determine which place in a binary number the particles represent. After determining which particles represent which binary numeric places, the specific binary number can be determined. An individual can perform the detection and analysis manually. Alternately, it is foreseen that the system can be automated such that a computer performs the detection and analysis. If desired, the microparticles can be separated from the object before examination. For example, a premium grade personal care product, such as a shampoo, conditioner, or lotion, marked with a series of microparticles can be filtered to remove the particles. The particles can then be washed dried and viewed under a microscope. Personal care products are often marked for the purpose of identifying diverters of the distribution chain. Using shampoo as an example, the microparticles may be applied to the product itself, the bottle, the label, the cap, or other packaging or shipping containers.

The end user can prepare the microparticles, or the microparticles can be "pre-manufactured", placed in appropriate storage containers and supplied to an end user as a kit. In some embodiments, the kit could include a code key identifying the place (and value, if applicable) in a number represented by each of the microparticles. The kit may even contain an adhesive for applying the microparticles to an object. The end user may also formulate codes from an inventory of pre-manufactured microparticle sets at the time of use.

If desired, the particles may also include visual enhancers. Visual enhancers include, for example, pearlescent colorant, metal flake pigments, or glass microspheres, glitter etc. Visual enhancers provide the particle layers with a higher localized reflectance and a more characteristic appearance. Thus, the colored layers of the particles are more easily distinguished from each other, the substrate, and/or the marked material. For example, if green layers are used on a green substrate, visual identification could be difficult because the green layers might be "camouflaged" by the green background.

A visual enhancer may also be added to denote a numeric value to the microparticle. For example, a standard could be established that the absence of a colored chip denotes the value "0" for a specified place, the presence of a colored chip without enhancer denotes the value "1" for the same place, and the presence of a colored chip with a visual enhancer denotes the value "2" for the place.

The addition of visual enhancers can also be used to further differentiate color layers of the particles from one another. For example, primary colors (i.e., red, yellow and blue) are easy to distinguish from one another. However, it may be more difficult to distinguish primary colors from secondary colors (i.e., orange, green, and purple). Thus, if primary colors are used in combination with secondary colors, the thin colored layers of the microparticles may be less distinctive.

To reduce the possibility of confusion, a visual enhancer can be added to either some or all of the colors. For example, the secondary colors may include a glitter visual enhancer so that glitter-orange is less likely to be confused with (non-glitter) red or (non-glitter) yellow.

As an alternative to visually distinguishable characteristics such as color and visual enhancer features, the layers of the inventive microparticle systems may be distinguished by machine-readable characteristics. Machine-readable characteristics may include color or color enhancer characteristics difficult to distinguish visually; IR or UV absorption, reflection, fluorescence or transmission characteristics; magnetic; and/or radioactive characteristics.

Higher Numeric-Base Multiparticle Taggant Systems

If the base of the numbering system is too low, the number of particles required for a given numeric code may be impractical for many applications, thus not being suitable for many customer needs. For example, using a binary, or base 2 system, anywhere from 1 to 20 particles are needed to count to 1 million in decimal, and the number of particles changes from code to code. Thus, while dual layer particles provide many advantages, their use in the inventive system does have some disadvantages. In particular, the amount of microparticle material needed to identify a single number is widely variable, depending on the particular number coded. For instance, an adhesive or coating formulation desirably will be formulated with a specific concentration of each different particle per unit volume or weight of the formulation, the concentration being selected to be high enough such that the detection method selected for identifying the code will essentially always find at least one, and preferably more than one, of each distinct particle used in the coded number. However, for a 28 pair code system, as discussed above, the number of particles employed in a coded number can vary from 1 to 28. Thus the volume or weight amount of taggant, which the adhesive or coating formulation would need to accommodate, will vary by a multiple of 28. This can be a substantial disadvantage in many applications, such as food, pharmaceutical or agricultural products, where different or additional validity testing may be required for the range of taggant concentrations utilized. Also, many-particle numbers may have a noticeably different visual effect on the product on which the taggant is carried than the effect produced by few-particle numbers.

A related disadvantage of the two-layer particle system is a difficulty in predicting production quantities. There will be considerable differences in production weight and volume of particles needed to formulate different codes. Therefore scheduling individual particle production to coordinate with particle demand can be difficult.

On the other hand, if the base of the numbering system is too high, the number of particles that must be pre-manufactured to represent a desired number of codes becomes impractical.

Overcoming these disadvantages of the two-layer particle system, while maintaining a high number of available codes and allowing those codes to be formulated from a relatively small inventory of different pre-manufactured particles (i.e. microparticle sets), is the object of a farther aspect of the invention. In this aspect of the invention, the microparticles have at least three layers, preferably three or four, most preferably three layers. Each of the microparticle sets employed in the taggant include at least one datum marker layer and at least two value marker layers. The datum marker functions to indicate orientation for the value markers, as already indicated above. However, the datum marker layer or layers is also coded to specify a place in the number code so the value markers each designate a value within the indicated place. The place code uses colors readily distinguishable from each other and from those used for value markers so that the orientation indicating datum is not confused with the place value indicating colors. In this way, more numeric information can be coded into a still manageable number of microparticle sets so that the total number of particles used in any given code may be fixed at a small number, or vary only over a small number of particle sets required for any given number and yet the range of available codeable numbers remains high.

At least two numeric places should be selectable by distinguishable datum marker layer(s) in this system. Desirably the datum marker layer(s) are selected from at least three, and in some cases suitably four or more, available distinguishable marker characteristics and the value marker layers are selected from at least four, more preferably about 6–10 distinguishable marker characteristics.

Using the same colors as the electrical color-code standard black, brown, red, orange, yellow, green, blue, violet, gray, and white, and including the colors gold and silver, a total of 12 distinctive color indicators are made available. Referring to the color scheme example in Table 1 for assignment of value indicator colors, the additional four colors of the 12 color system, i.e. brown, orange, gray and white, can be employed as datum/place markers.

Because the value indicators have orientation, each pair of value indicators can have two value assignments. For instance, with brown as a place indicator and blue and green as value indicators, then blue/green can be differentiated from green/blue in the respective particles brown/blue/green and brown/green/blue. An illustration of this orientation effect is as shown in Table 3:

TABLE 3

|   |         | gold | silver | magenta | black | green | yellow | blue | red | total |
|---|---------|------|--------|---------|-------|-------|--------|------|-----|-------|
| 1 | red     | x    | x      | x       | x     | x     | x      | x    | —   | 7     |
| 2 | blue    | x    | x      | x       | x     | x     | x      | —    | x   | 7     |
| 3 | yellow  | x    | x      | x       | x     | x     | —      | x    | x   | 7     |
| 4 | green   | x    | x      | x       | x     | —     | x      | x    | x   | 7     |
| 5 | black   | x    | x      | x       | —     | x     | x      | x    | x   | 7     |
| 6 | magenta | x    | x      | —       | x     | x     | x      | x    | x   | 7     |
| 7 | silver  | x    | —      | x       | x     | x     | x      | x    | x   | 7     |
| 8 | gold    | —    | x      | x       | x     | x     | x      | x    | x   | 7     |
|   |         |      |        |         |       |       |        |      |     | 56    |

With such orientation, and an unrestricted number of particles per number, $2^{55}$ codes can be produced in a binary code as described above. However, the number of particles necessary to represent those codes will usually be impractical.

As an alternative to a binary coding system a high-base, low-place system If twelve colors are used with four devoted to datum/place and eight devoted to value, the number of values indicated by the eight value colors is 56 (twice the 28 indicated by unoriented values) and the number of places is 4. Only 224 microparticle sets (56×4) are required to achieve $56^4$ (decimal 9,834,486) different coded numbers, and only four particles are required to express any number within that range. The 224 microparticles can be pre-manufactured as stock inventory.

Optionally null values for any place can continue to be indicated by the absence of detection of a microparticle of that place, as utilized in the binary system above, in which case the number of particles utilized to code an available number will vary from 1 to 4 in the case of a four-place taggant. If greater certainty in detection, or if greater formulation uniformity is desired, one of the available values at each place may be assigned to indicate the zero value for that place. For instance, each of the 56 pair sets in Table 3 above, can be assigned one of the values 0–55. Any number from 0–9,834,485 can then be written with exactly four particles of three layers each, using zero value particles for places which are null. In that way, for instance, if sequential place value datum indicators are brown, orange, gray and white, zero value is red/gold and 55 value is gold/red, the decimal number 55 would be indicated by the four particles brown/gold/red;

orange/red/gold;

gray/red/gold; and white/red/gold.

Unique numbers within the available range can be assigned randomly or in accordance with any desired protocol. With the four-place system just discussed, once the number is assigned, the corresponding taggant can be rapidly formulated merely by mixing four (or fewer) members from the stock inventory. In this way, the number of layers remains low and the total number of particles required to be manufactured remains manageable, while at the same time the variability in the number of particles required to be employed in the taggant is reduced or eliminated.

For a given number of available color indicators, and a fixed number of layers, the balance between colors allocated to place/datum indicators and to value indicators will affect the parameters of the number of available codes which can be produced, the number of particles needed to depict the codes and the inventory of particles which must be produced. This is illustrated by Table 4, which shows variations in these parameters for different allocations for a 12 color, three-layer system, assuming all codes assign a zero value in each place, and assuming that the number of particles used in a code is no more than the number of colors allocated to places. In Table 4, the columns under the heading "Maximum value per place" indicate the maximum number of codes available for each of the indicated places 2–5 when up to 5 of the available places are utilized.

For instance, a code that needs two particles to represent all of the numeric information will require half of the manufactured material as a code that requires four particles, but some numbers of codes cannot be achieved with a two-particle, three-layer system or may be obtainable with fewer different pre-manufactured particles using a four-particle system. In high volume applications, this difference can be quite substantial, and may be the difference between a cost-effective system and one that is not.

To choose an optimal taggant system Table 4 is referenced. It can be seen what combination of place and value indicators will minimize the number of individual component particles that will be needed to make up the desired numeric codes, and what combination will minimize the number of different particles that will need to be premanufactured in order to represent the desired numeric codes. Table 4 shows that to obtain at least 3,000 codes while minimizing the number of particles required to represent each value, rows 2–4 all achieve more than 3,000 codes with two places. In row 2, starting with 12 colors, 10 can be paired as value indicators, and 2 can be assigned as place indicators. Hence, a base 90 number system with 2 numeric places is created having a maximum value of 8,100. This is more than sufficient to yield the 3,000 codes required. 123 total particles must be manufactured for 3,000 codes. In row 4, with 8 colors allocated to values, 3,126 colors are obtained with 2 place colors. Hence a base 56, with 2 numeric places is adequate to meet the objective. Only ten total colors are needed and only 109 particles must be pre-manufactured.

TABLE 4

| Row # | colors allocated to values | colors allocated as place indicators | color pairs (values) | total particles to form max. codes | Maximum codes | Maximum value per place | | | |
|---|---|---|---|---|---|---|---|---|---|
| | | | | | | 2 pl | 3 pl | 4 pl | 5 pl |
| 1 | 11 | 1 | 110 | 110 | 110 | | | | |
| 2 | 10 | 2 | 90 | 180 | 8100 | 8100 | | | |
| 3 | 9 | 3 | 72 | 216 | 373000 | 5184 | 373000 | | |
| 4 | 8 | 4 | 56 | 224 | 9800000 | 3126 | 176000 | 9800000 | |
| 5 | 7 | 5 | 42 | 210 | 131000000 | 1764 | 74000 | 3100000 | 131000000 |
| 6 | 6 | 6 | 30 | 180 | 729000000 | 900 | 27000 | 810000 | 24000000 |
| 7 | 5 | 7 | 20 | 140 | 128000000000 | 400 | 8000 | 160000 | 3200000 |
| 8 | 4 | 8 | 12 | 96 | 430000000 | 144 | 17628 | 21000 | 249000 |
| 9 | 3 | 9 | 6 | 54 | 10000000 | 36 | 216 | 1296 | 7776 |
| 10 | 2 | 10 | 2 | 20 | 1024 | 4 | 8 | 16 | 32 |

EXAMPLE 1

Using a color set of up to 12 colors as described previously, and with the aid of Table 4, we can select the number of colors assigned as place indicators and value indicators to design an optimal numbering system for a particular application.

In this example, a series of 3,000 numerically coded particle sets is needed to tag 3,000 batches of plastic. It is determined that each batch of plastic will need one gram of each of the component particles. It is also determined that it is important that a fixed number of particles be used to represent the codes so that when a field agent analyzes the plastic they know to look for a specific number of different particles.

From a manufacturing standpoint, it is important to minimize both the number of particles needed to represent each code and the number of different particles needed to be pre-manufactured to represent a desired number of codes.

EXAMPLE 2

A system which uses different datum layers can also be employed to carry different information in a multi-particle taggant, for instance, to represent different numeric features of a date code.

In this example a tagging system is needed to incorporate expiration dates into a bulk material. Several approaches can be used. First, a Julian date can be implemented, where the number of the day (1–365) is represented by one or two particles, and the year is represented by another particle. This approach would require a two or three particle system. If the system is required to span a period of twenty years, a total of only twenty year-indicator particles are needed. From Table 4 it can be seen in Row 7 that 5 value indicator colors are needed to create 20 pairs with a single datum color used to indicate the particle as carrying year information. Those 20 pairs can be assigned numeric values and then used to represent the respective years.

To minimize the number of particles in a given code for day information, the 365 day values can be represented by either one or two particles. If one particle is used to represent all 365 days we must select a numbering system that is base 365 or greater. Again, consulting Table 4 we see that with three layers and 11 value indicator colors, we do not get a base system greater than 110. See row 1. To accomplish this either more colors must be added as value indicators, more than 3 layers must be incorporated into the particle, or more than one particle must be used to represent date information.

The other options are to use a four-layer particle or 2 three-layer particles. By analogy to Table 4, it can be seen that using the colors available, more than 365 different particles can be manufactured using 4 layers. Given this approach, 20 year particles plus 365 day-particles for a total of 385 particles must be premanufactured to achieve these numbers. In actual production however, only one year particle must be manufactured each year giving a realized annual total of 365 plus 1 for a total of 366 particles per year.

If 2 three-layer particles are chosen to represent the day of the year, we can see from Table 1, row 7 that we can create 400 codes using 5 value indicator colors in 2 places, the places being indicated with 2 colors different than used to designate the year particle and different from the colors used for values in both the day and year systems. When used next to a datum layer, the 5 value indicator colors can be paired for a total of 20 value indicators. The 20 particles can be premanufactured for each of the 2 places yielding a total of 20*2=40 particles. Here, the realized annual requirement is 20=12=32 day indicator particles plus one year indicator particle for a total of 33 premanufactured particles. Over the span of 20 years this system will require 32 plus 20 particles for a total of 52 particles. This is a much simpler system than the four-layer approach discussed above.

An alternate date coding system which could be used is the Month, Day, and Year approach. With this scheme, the highest numeric value needed is 31, to represent the number of days in a month. The numbering system can be arranged into 3 particles with the datum/place layer used to distinguish Month, Day, and Year particles. Consulting Table 1 it can be seen that row 5 will give 42 value indicator pairs using 7 paired colors. So, we choose 7 value indicator colors, and 3 place indicator colors for a total of 10 colors.

Place 1, which represents the month only needs a total of 12 particles. Place 2 which represents the days of the month will need a total of 31 particles. And finally, place 3 will need 20 particles, one for each of the years. On an actualized annual basis, 12 plus 31 plus 1 particles will be need, for a total of 44 particles each year. This is sufficiently close to the 33 particles of the previous alternative to be a competitive alternative coding system.

In each of the embodiments of the invention taggants are formulated with multiple microparticle sets, the collective sets being used to code an individual number or combinations of numbers. It may be possible that the microparticle sets may employ different numbers of layers. However it is preferred that each of the microparticle sets employed in the taggants of the invention have the same number of layers. In this way, only particles showing the selected number of layers would be taken as part of the code. Microparticles showing fewer than the selected number of layers would always be recognizable as incomplete and therefore rejected. If a mixture of microparticle sets of different numbers of layers is employed, incomplete fragment particles from the higher number of layers may be mistaken as particle sets of the lesser number of layers and thus give an incorrect code reading.

Two, three and four layer particles are all easier to manufacture than 5 or higher layer particles currently employed in commercial systems. Thus, not only does the invention provide a way of formulating a large number of particle codes from a relatively small inventory of premanufactured particles, it also reduces manufacturing costs for the individual particles. Moreover, for a given layer thickness, fewer layers provides smaller particles, a desirable objective in many applications.

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

The above examples and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

What is claimed is:

1. A process for marking an article by applying thereto a taggant, a marking formulation comprising a taggant, or an article marked with a taggant, wherein the taggant comprises a plurality of particles having two or more distinguishable marked layers corresponding to a predetermined numeric code, the invention characterized in that:
 the plurality of particles comprises a plurality of particle sets of at least one particle,
 each particle set is characterized by a specific marker layer combination different from each other particle set, and
 the combination of particle sets employed in said taggant collectively forms said numeric code.

2. The invention of claim 1 wherein the marker layers each comprises a distinguishably different color or color enhancer.

3. The invention of claim 1 wherein the each said specific marker layer combination has the same number of layers.

4. The invention of claim 1 wherein each said specific marker layer combination employs two or three layers.

5. The invention of claim 1 wherein each said specific marker layer combination employs two layers, the numeric code is a binary code having a predetermined number of laces and having two values at each place, each particle set codes for one said value in a specific place in the code and the absence of said particle set in the taggant codes for the other said value at said specific place.

6. The invention of claim 1 wherein the particle sets employed in the taggant include at least one datum marker layer coded to include place information and at least two value marker layers coded to specify a value within the place, the at least one datum marker layer being readily distinguishable from the value marker layers and functioning to identify an orientation of the value marker layers.

7. The invention of claim 6 wherein the at least one datum marker layer is selected from at least two distinguishable marker characteristics.

8. The invention of claim 7 wherein each said particle set is made up of three-layer particles composed of one said datum marker layer and two value marker layers.

9. The invention of claim 8 wherein each distinguishable marker characteristic is a visually distinguishable color or color enhancer or a color, magnetic or radioactive feature distinguishable by a sensing machine.

10. The invention of claim 6 wherein the marker layers each comprises a distinguishably different color or color enhancer.

11. The invention of claim 6 wherein the each said specific marker layer combination has the same number of layers.

12. The invention of claim 6 wherein each said specific marker layer combination employs three or four layers.

13. The invention of claim 6 wherein each said particle set represents a value at a given place, the at least one datum marker layer codes for said place and the combination of value marker layers codes for said value at said place.

14. The invention of claim 13 wherein the at least one datum marker layer is selected from at least two distinguishable marker characteristics, the at least two value marker layers are selected from at least three distinguishable marker characteristics, the total number of distinguishable marker characteristics is a fixed number and the number of marker characteristics allocated as datum markers and as value markers, respectively, is selected to minimize the number of different microparticles necessary to sequentially represent all values within a predetermined range of values with said fixed number of marker characteristics.

15. The invention of claim 14 wherein each said marker layer combination has three layers.

16. A process for marking an article by applying thereto a taggant, a marking formulation comprising a taggant, or an article marked with a taggant, wherein the taggant comprises a microparticle having three or more distinguishable marker layers corresponding to a predetermined numeric code, said marker layers comprising at least one datum marker layer coded to include place information and at least two value marker layers coded to specify a value within the place, the at least one datum marker layer being readily distinguishable from the value marker layers and functioning to identify an orientation of the value marker layers.

17. The invention of claim 16 wherein the combination of value marker layers collectively determines said value within said place.

18. A process for marking an article by applying thereto a taggant, a marking formulation comprising a taggant, or an article marked with a taggant, wherein the taggant comprises a microparticle having two distinguishable marker layers corresponding to a predetermined numeric code, the combination of said two marker layers determining both numeric place and a value within said place in a binary numbering system.

19. A process for marking an article by applying thereto a taggant, a marking formulation comprising a taggant, or an article marked with a taggant, wherein the taggant comprises a particle having two distinguishable marker layers of different color characteristics wherein the paired combination of color characteristics provided by said two layers codes for a numeric value.

20. A method for marking an object with a taggant comprising a plurality of coded taggant particles, the method comprising:

providing the plurality of taggant particles characterized in that it comprises at least two different elements on at least two different particles, the elements represented by said different particles forming an element series, each element in said series conveys numerical value and position information, and the combination of different elements employed in said series, taken together, provides a coded number comprising a plurality of values at a plurality of positions of a predetermined numerical code, and applying the plurality of particles to the object.

21. The method as in claim 20 wherein the particles have two or more distinguishable colored layers, said layers in combination providing said element.

22. The method of claim 20 wherein the numerical code is binary code having two values at each position, each different element codes for one said value at a specific position and the absence of said element in the taggant codes for the other said value at said specific position.

* * * * *